(No Model.)
L. W. HARDY.
ANTI-FRICTION BEARING FOR CAR AXLES.
No. 439,654. Patented Nov. 4, 1890.
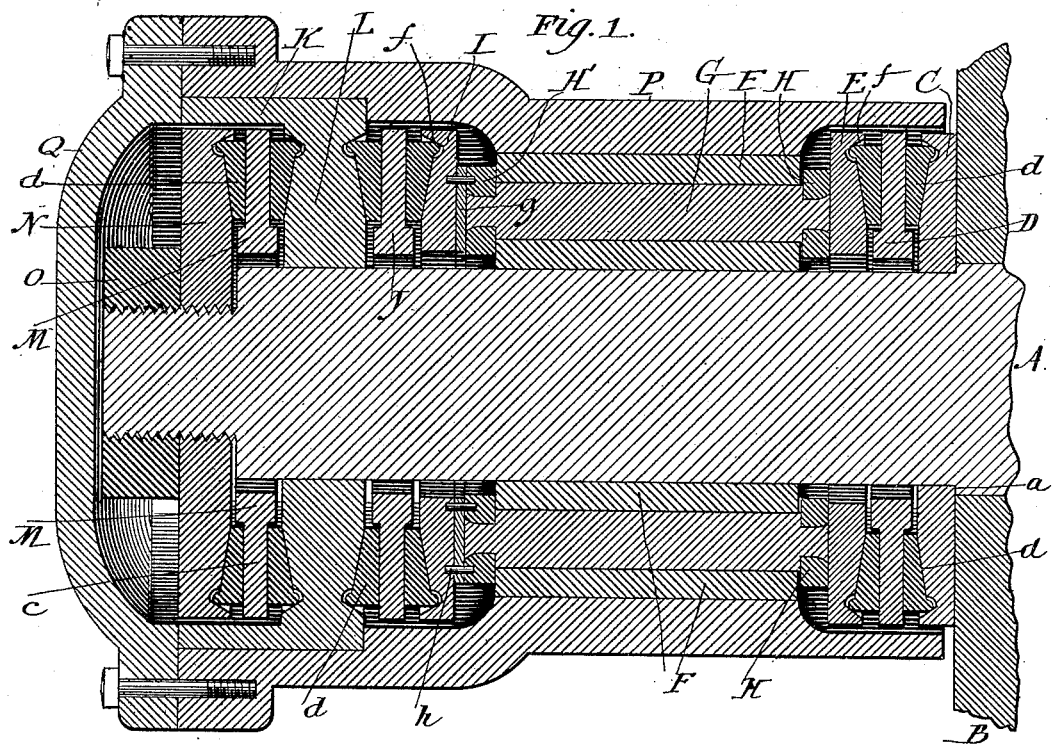
Witnesses:
Harry T. Jones.
Albert H. Adams.
Inventor:
Lewis W. Hardy

UNITED STATES PATENT OFFICE.

LEWIS W. HARDY, OF CHICAGO, ILLINOIS, ASSIGNOR TO THE ROLLER-BEARING AXLE COMPANY, OF HILLSBOROUGH, WISCONSIN.

ANTI-FRICTION BEARING FOR CAR-AXLES.

SPECIFICATION forming part of Letters Patent No. 439,654, dated November 4, 1889.

Application filed March 21, 1890. Serial No. 344,749. (No model.)

*To all whom it may concern:*

Be it known that I, LEWIS W. HARDY, residing at Chicago, county of Cook, and State of Illinois, and a citizen of the United States, have invented a new and useful Improvement in Anti-Friction Bearings for Car-Axles, of which the following is a specification, reference being had to the accompanying drawings, in which—

Figure 1 is a vertical longitudinal section. Fig. 2 is a plan of the spider which carries anti-friction rollers. Fig. 3 is a plan of one of the rings used in connection with the rollers used on the spiders. Fig. 4 is a plan of one of the rings which receives the shafts for the longitudinal anti-friction rollers.

The object of my invention is to provide against endwise movement of the boxes of car-axles, which movement, as axles and boxes have heretofore been constructed, is caused by the side motion of the car, which I accomplish by providing devices by means of which the boxes will be constantly held at the same distance apart, and at the same time providing anti-friction devices to receive the end thrust, all as illustrated in the drawings and hereinafter fully described.

That which I claim as new will be pointed out in the claims.

In the drawings, A represents a car-axle, which, as shown, is provided with a shoulder *a*.

B is a car-wheel secured to the axle.

C is a metal ring on the axle.

D is a spider, which consists of a ring *b*, which encircles the axle, and is provided with a number of pins *c*, which serve the purpose of axles for the tapering rollers *d*.

E is another metal ring similar to the ring C.

F are rollers located on short shafts G, the ends of which are secured in metal rings H H'.

I is another ring similar to the ring C.

J is another spider carrying rollers the same as *d*.

K is a metal ring which is provided with a downward extension L, the two parts K L being made together.

M is another spider, which carries rollers the same as *d*.

N is another ring, which is connected with the axle by a screw-thread.

O is a nut on the axle.

P is the shell or box, which box is made in two parts provided with flanges and bolted together, as usual.

Q is a cap secured to the box P by means of a screw.

The outer end of each of the rollers *d* is provided with a ball-bead *e*, and each of the rings C, E, I, and N and the opposite side of the part L, which may be called a "thrust-flange", each provided with a recess to receive the ball-beads *e* on the spiders used in connection with the rings and thrust-flange, which recesses in the rings and thrust-flange are not concentric with the ball-beads, but have the form indicated in the drawings, as shown at *f*, one side being angular and the other side curved, forming a single bearing-point for the ball-beads on the rollers.

*g* is a washer, which may be made of rubber, leather, or other suitable material, which is held in place by pins *h*, which are secured in the ring H'.

The parts are put together as follows: The ring C is first slipped onto the axle over the end. Then the spider D, with its rollers, is placed upon the axle. Then the ring E is put into place. Then the rollers F, with their shafts G and rings H H', are placed upon the shaft. Then the other parts which are on the axle are brought to place one after another, and at any suitable time the box P is secured in place, after which the cap Q is secured to the box.

By means of the construction described the boxes are so secured upon the axle that they cannot have any appreciable endwise movement. At the same time, by means of the rollers *d* and the rings against which they bear, no material friction will be produced by the end thrust of the parts, the direction of which varies with the varying side movements of the car.

What I claim as new, and desire to secure by Letters Patent, is as follows:

1. In a car-axle bearing, a spider provided with a series of arms, each carrying a tapering roller having a ball-bead *e*, in combination with bearing plates or rings for such rollers, each ring having a groove *f*, one part being angular, substantially as and for the purposes specified.

2. As an improvement in car-axle bearings, in combination with an axle, a series of longitudinal rollers, a spider D, carrying a series of vertical rollers, bearing-plates C E for such rollers, a thrust-flange L, vertical rollers on each side thereof, and bearing plates or rings I and N, substantially as and for the purpose specified.

3. As an improvement in car-axle bearings, in combination with an axle, a series of longitudinal rollers, a spider D, carrying a series of vertical rollers, each provided with a ball-bead $e$, and bearing plates or rings C E for such rollers, each provided with a groove $f$ to receive the rollers, substantially as and for the purpose specified.

4. As an improvement in car-axle bearings, in combination with an axle, a series of longitudinal rollers F, a thrust-flange L, two sets of vertical rollers, one set on each side of the thrust-flange L, and bearing plates or rings I N, substantially as and for the purposes specified.

LEWIS W. HARDY.

Witnesses:
   HARRY T. JONES,
   ROBERT A. MILLAR.